(12) United States Patent
Ito (10) Patent No.: US 7,349,367 B2
(45) Date of Patent: Mar. 25, 2008

(54) BASE STATION DEVICE, CONTROL METHOD OF BASE STATION DEVICE AND CONTROL PROGRAM OF BASE STATION DEVICE

(75) Inventor: Tadayoshi Ito, Moriguchi (JP)

(73) Assignee: Sanyo Electric Co., Ltd., Moriguchi-Shi (JP)

( * ) Notice: Subject to any disclaimer, the term of this patent is extended or adjusted under 35 U.S.C. 154(b) by 667 days.

(21) Appl. No.: 10/842,477

(22) Filed: May 11, 2004

(65) Prior Publication Data
US 2004/0228299 A1 Nov. 18, 2004

(30) Foreign Application Priority Data
May 16, 2003 (JP) .............................. 2003-139164

(51) Int. Cl.
*H04Q 7/00* (2006.01)

(52) U.S. Cl. ...................... 370/328; 370/335; 370/329

(58) Field of Classification Search ................ 370/328, 370/18, 318, 329, 335, 395.21; 375/133
See application file for complete search history.

(56) References Cited

FOREIGN PATENT DOCUMENTS

| JP | 05-191336 A | 7/1993 |
|---|---|---|
| JP | 08-265836 A | 10/1996 |
| JP | 10-136438 A | 5/1998 |
| JP | 11-069427 A | 3/1999 |
| JP | 11-234732 | 8/1999 |
| JP | 2000-004472 A | 1/2000 |
| JP | 2000-102056 | 4/2000 |

*Primary Examiner*—Jean Gelin
*Assistant Examiner*—Phuoc Doan
(74) *Attorney, Agent, or Firm*—Foley & Lardner LLP (57) ABSTRACT

In the case where two base stations are cascaded by a signal line for ensuring more information channels, if traffic increases in the base station on a master side, it can be considered that communication conditions of the base station on the master side are better than those of the base station on a slave side at that point in time. Sending of the control channel is switched between one and the other of the cascaded two base stations depending on the situations at that point in time, and therefore the base station providing good communication conditions can perform the communication with a mobile terminal to a larger extent so that the communication can be stable. Users can easily perform outgoing and incoming calls with respect to the base station. A base station, which can accommodate more users and can offer 64-kpbs service with an improved probability, is provided.

9 Claims, 7 Drawing Sheets

BASE STATION DEVICE, CONTROL METHOD OF BASE STATION DEVICE AND CONTROL PROGRAM OF BASE STATION DEVICE

BACKGROUND OF THE INVENTION

1. Field of the Invention

The present invention relates to a base station for use in mobile communication by mobile phones or the like, and particularly to a public base station of PHS.

2. Description of the Background Art

Cellular phones, PHS (Personal Handyphone System) and others have been known as mobile communication system performing wireless communication via a base station.

In the PHS, a radio signal is formed of frames divided into eight slots. Among the eight slots, first four slots form a down signal sent from a base station to a mobile terminal, and second four slots form an up signal sent from the mobile terminal to the base station. This manner has been referred to as "Time Division Multiple Access (TDMA)".

In the conventional base station, the four slots are assigned to one control channel and three information channels. The control channel transfers information relating to a channel structure, system information and others from the base station to the mobile station, and also transfers control information required for calling and connection. The information channel is a bidirectional channel transferring user information such as call or conversation information and data transmission information. The information channel to be used among the plurality of information channels is determined by transmitting a control signal between the base station and the mobile station via the channel for control.

Assuming that C represents the control channel and T represents the information channel, the conventional base station basically has a structure of 1C3T. Thus, one slot is used for sending and receiving the control signal, and the other three slots are used primarily for sending and receiving the user information.

The conventional base stations for the PHS include such a kind of base station that uses all the slots as the call channels, and thus 4T-base stations are connected to increase the number of information channels. For example, Japanese Patent Laying-Open No. 2000-102056 has pointed out a problem of a failure in such a base station of 1C7T.

Figure 7:
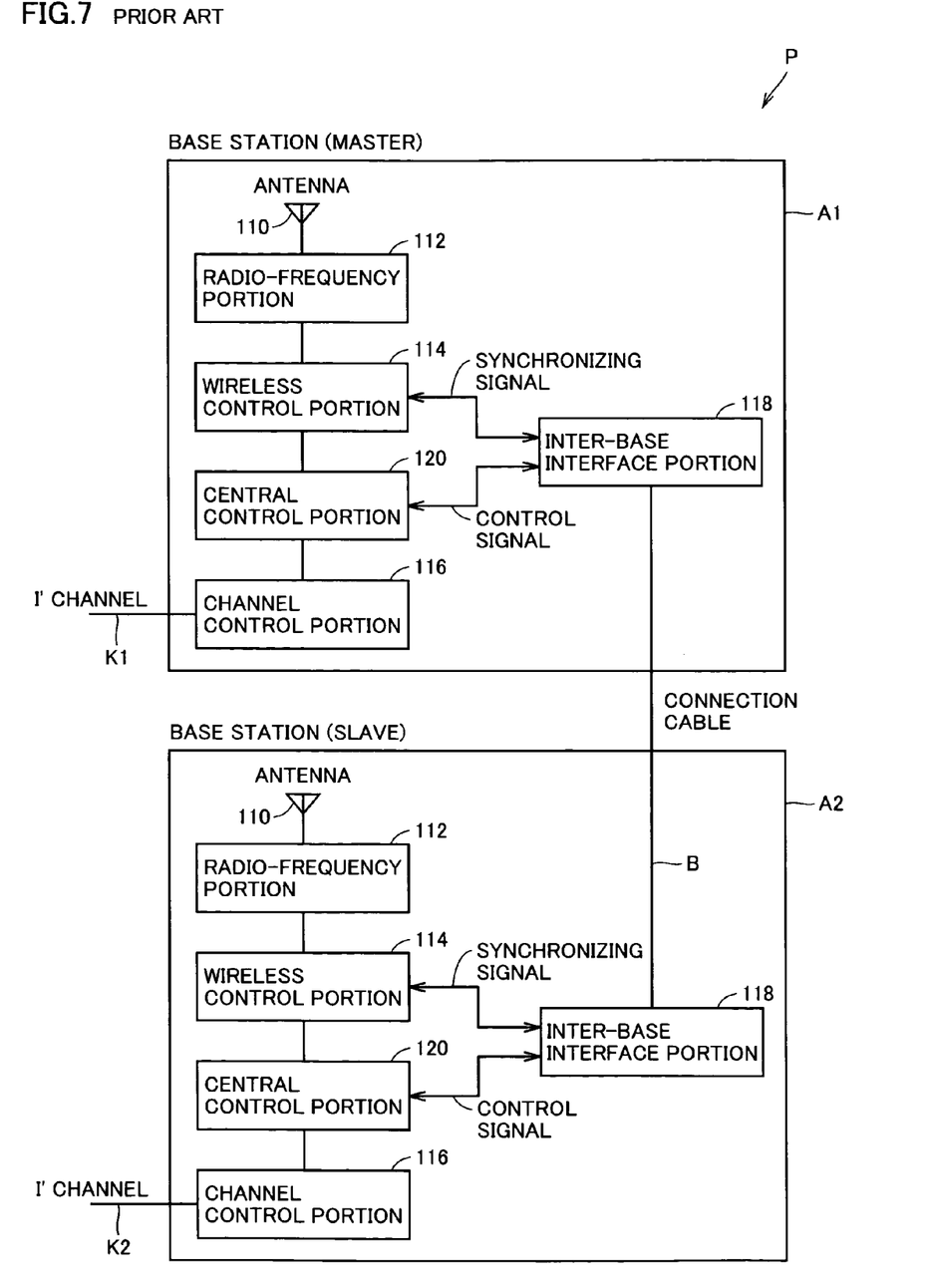
FIG. 7 is a schematic block diagram of a conventional base station of 1C7T.

FIG. 7 is a schematic block diagram of a conventional base station of 1C7T.

Referring to FIG. 7, a base station P is formed of a base station A1 of 1C3T-type and a base station A2 of 4T-type, which are connected together by a connection cable B, and operates as a base station of 1C7T-type as a whole.

Base station A1 includes an antenna 110, a radio-frequency portion 112, a wireless control portion 114, a line control portion 116, an inter-base interface portion 118 and a central control portion 120.

Antenna 110 is used for sending and receiving a radio signal to and from a portable terminal. Radio-frequency portion 112 is provided for converting frequencies of send and receive signals. Wireless control portion 114 is provided for controlling wireless communication with portable terminals, and operates to modulate data such as conversation data in an appropriate modulation method, e.g., according to a PHS communication method and to demodulate received data modulated in such modulation method.

Line control portion 116 is connected to an I' line (ISDN (Integrated Service Digital Network) line for PHS) serving as a cable network for controlling communication between the I' line and central control portion 120. Inter-base interface portion 118 is connected to an inter-base interface portion of another base station, and provides an interface between base station A1 and another base station. More specifically, it operates to send and receive control signals and synchronizing signals to and from another base station. Central control portion 120 is provided for controlling the foregoing operations of the portions in base station A1. Since base station A2 has a structure similar to that of base station A1, description thereof is not repeated.

Base stations A1 and A2 are configured to allow switching between a function of a master base station and a function of a slave base station. Thus, base stations A1 and A2 can be switched between master and slave states, i.e., between a state of the master station and a state of the slave station in accordance with predetermined switching factors.

When a failure occurs in the master base station, the slave base station is switched to operate as a master base station so that a function of a normal operation can be maintained as long as possible. These are disclosed in the Japanese Patent Laying-Open No. 2000-102056.

As described above, it has been studied to provide base stations configured such that two or more base stations can be cascaded by a signal line to operate them as one base station as a whole.

When arranged individually, each base station operates with 1C3T, i.e., with one control channel and three information channels. When two base stations of the above type are arranged, three users can make calls per base station, and six information channels in total can be ensured.

If two or more base stations are cascaded, only one base station is required to operate as a master base station (i.e., base station on a master side) having a control channel, and other base station(s) can use all the channels as information channels. Thus, in the case of employing two cascaded base stations, the master base station operates with 1C3T, and the slave base station (i.e., base station on the slave side) operates with 4T so that 1C7T is achieved in total. In this case, seven information channels can be ensured, and thus can offer service to seven users within an area of the two base stations. Thus, the information channels can be increased by one from those provided by two independent base stations.

When the base station allocates the channels, it usually gives higher priorities to the channels of better conditions. More specifically, the base station performs carrier sense (measurement of an amount of interference) with each slot and each frequency for channel allocation. In the cascade base station formed of base stations CS1 and CS2 connected together, when it receives a request for link channel establishment from a mobile terminal, the base station allocates the best channel to the mobile terminal based on a result of the carrier sense of each of base stations CS1 and CS2 as well as a value of an electric power of reception of the link channel request message. For example, a channel causing minimum interference is allocated to the mobile terminal.

However, traffic may concentrate on the base station (master base station) sending a control channel CCH. It can be considered that concentration of the traffic occurs because the master base station provides the best conditions at the time of the channel allocation to the mobile terminal. For example, users of the mobile terminals located near the master base station are more than those located near the slave base station. In this case, the cascaded base stations cannot accommodate the user any more as a whole because the master base station operating control channel CCH, although good conditions are achieved on the side of the master base station.

The PHS system usually performs the communication of up to 32 kbps per channel, but faster communication has recently been required in mobile communication for the Internet browsing and others. For example, such service is already offered that allows communication at 64 kpbs, i.e., double the ordinary speed by using two channels of 32 kpbs, as is standardized by the PHS Internet Access Forum Standard (PIAFS).

The service of 64 kbps can be offered only when two empty information channels are present in one base station at the time of reception of a request from the mobile terminal. Therefore, even when two or more empty information channels are present in the two cascaded base stations as a whole, the master base stations cannot offer the requested service of 64 kbps, if only one empty channel is present in the master base station at that point in time.

SUMMARY OF THE INVENTION

An object of the invention is to provide a base station device, which can accommodate more users.

Another object of the invention is to provide a base station device, which can offer 64-kpbs service with an improved probability.

In summary, the invention provides a base station device for performing wireless communication with a mobile terminal device, including first and second base stations, and a signal line. One of the first and second base stations operates as a master base station using one of a plurality of wireless channels as a control channel, and using the other wireless channel(s) as an information channel(s), and the other of the first and second base stations operates as a slave base station receiving a control signal from the master base station for operation. The signal line connects the first and second base stations together for sending the control signal from the master base station to the slave base station. Each of the first and second base stations includes a central control portion operating, when the corresponding first or second base station is operating as the master base station, to observe a state of an empty channel of the slave base station, use as the control channel the empty channel of the base station currently operating as the slave base station depending on the state of the empty channel of the slave base station, and make the control channel of the base station currently operating as the master base station available for use as the information channel.

Preferably, the central control portion compares the number of the empty channels of the master base station with the number of the empty channels of the slave base station. When the slave base station has more empty channels than the master base station, the central control portion uses as the control channel the empty channel of the base station currently operating as the slave base station, and makes the control channel of the base station currently operating as the master base station available for use as the information channel.

Preferably, when the master base station is requested to perform communication using the two information channels, but cannot ensure the two information channels, and the slave base station has an empty channel, the central control portion uses as the control channel the empty channel of the base station currently operating as the slave base station, and makes the control channel of the base station currently operating as the master base station available for use as the information channel.

According to another aspect, the invention provides a control method of a base station device performing wireless communication with a mobile terminal device. The base station includes first and second base stations, and a signal line. One of the first and second base stations operates as a master base station using one of wireless channels as a control channel, and using the other wireless channel(s) as an information channel(s), and the other of the first and second base stations operates as a slave base station receiving a control signal from the master base station for operation. The signal line connects the first and second base stations together for sending the control signal from the master base station to the slave base station. The control method includes the steps of: operating the base station operating as the master base station to observe via the signal line a state of an empty channel of the slave base station, and determine, depending on the state of the empty channel of the slave base station, whether switching is to be performed to use as the control channel the empty channel of the slave base station; and operating the base station operating as the master base station to use as the control channel the empty channel of the base station currently operating as the slave base station, make the control channel of the base station currently operating as the master base station available for use as the information channel, and perform switching between the master base station and the slave base station.

Preferably, the control method further includes the step of comparing the number of the empty channels of the master base station with the number of the empty channels of the slave base station, and determining whether the slave base station has more empty channels than the master base station or not.

Preferably, the control method further includes the step of determining whether the master base station is requested to perform communication using the two information channels or not, and a step of determining that the master base station cannot ensure the two information channels. The step of operating the base station to observe and determine decides the switching when the slave base station has the empty channel.

According to further another aspect, the invention provides a program operating a computer to execute the control method of the base station of any one of the foregoing aspects.

If the traffic increases in the base station on the master side, it can be considered that the communication conditions (such as less interference with neighboring radio waves) of the base station on the master side are better than those of the base station on the slave side at that point in time. Therefore, according to a primary advantage of the invention, the sending of the control channel is switched between one and the other of the cascaded two base stations depending on the situations at that point in time, and therefore the base station providing good communication conditions can perform the communication with the mobile terminal to a larger extent so that the communication can be stable. Users can easily perform outgoing and incoming calls with respect to the base station.

When the base station on the master side is requested to perform communication at 64 kbps, but cannot ensure a second channel required for the 64-kbps communication, control channel CCH is changed to the base station. Thereby, the base station on the master side can offer the communication service at 64 kbps using the two wireless channels to the user so that the communication service at 64 kbps can be offered to up to two users.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Embodiments of the invention will now be described with reference to the drawings. In the drawings, the same or corresponding portions bear the same reference numbers.

[Whole Structure of Cascaded Base Stations]

Figure 1:
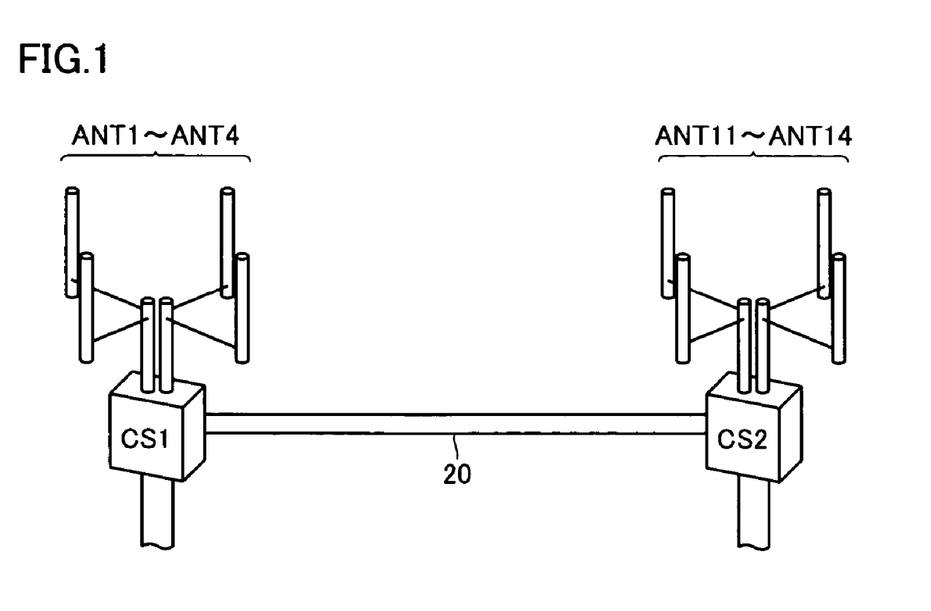
FIG. 1 illustrates a concept of cascaded base stations.

FIG. 1 illustrates a concept of a state of cascaded base stations according to the invention.

Referring to FIG. 1, antennas ANT1-ANT4 are connected to a base station CS1. Antennas ANT11-ANT14 are connected to a base station CS2. Base stations CS1 and CS2 are connected together by a signal line 20 formed of a cable. One of base stations CS1 and CS2 operates as a master base station (i.e., base station on a master side) performing transmission of 1C3T, and the other operates as a slave base station (i.e., base station on a slave side) performing transmission of 4T.

Figure 2:
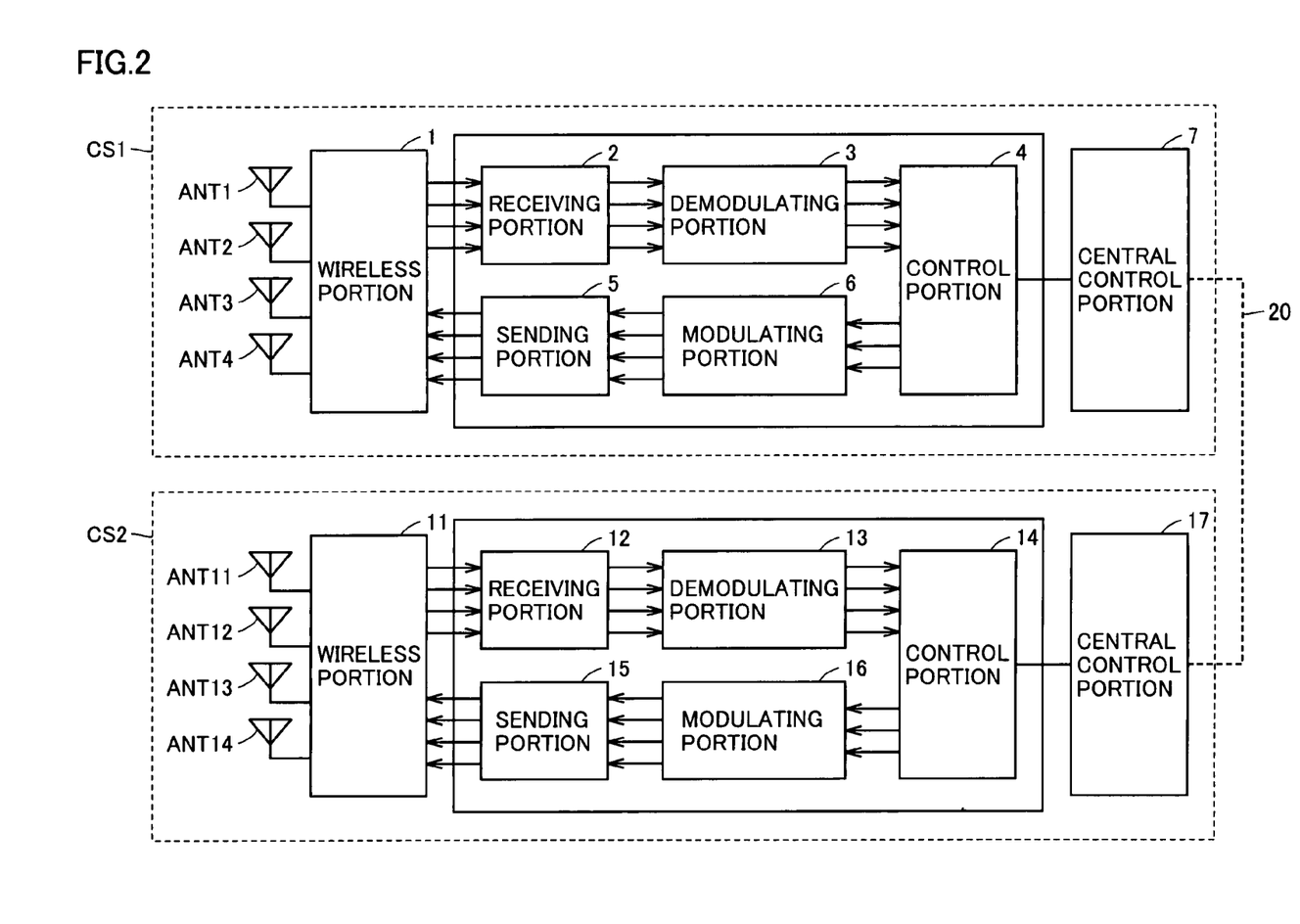
FIG. 2 is a function block diagram illustrating a structure of base stations according to an embodiment of the invention.

FIG. 2 is a function block diagram illustrating a structure of a base station according to the first embodiment of the invention.

Referring to FIG. 2, base station CS1 is formed of a plurality of antennas (e.g., antennas ANT1-ANT4), a wireless portion 1, a receiving portion 2, a demodulating portion 3, a control portion 4, a sending portion 5, a modulating portion 6 and a central control portion 7.

The plurality of antennas ANT1-ANT4 are connected to wireless portion 1. In a receiving operation of the above structure, antennas ANT1-ANT4 receive a signal frame by frame, and apply it via wireless portion 1 to receiving portion 2. Receiving portion 2 effects various kinds of analog signal processing such as amplification and frequency conversion on the receive signal, and an A/D converter (not shown) converts the analog signal to a digital signal. Further, receiving portion 2 separates and extracts a signal of each user from the others under the control of control portion 4. The received signal of each user thus separated and extracted is applied to demodulating portion 3, which performs necessary demodulation processing and time-sharing processing to restore the original signal, and provides it to control portion 4.

Control portion 4 sends the data to central control portion 7 frame by frame in sequence of time.

In the sending operation, a send signal applied from a public network (not shown) is sent via central control portion 7 to control portion 4. Control portion 4 sends the send signal, which is sent frame by frame, to modulating portion 6.

Then, the send signal sent to modulating portion 6 is subjected to necessary time-sharing processing and modulation processing, and is applied to sending portion 5. In sending portion 5, a D/A converter (not shown) converts the send signal to an analog signal, and various analog signal processing such as amplification and frequency conversion required for wireless sending is effected on the analog signal thus converted.

In the sending operation, the signal sent from sending portion 5 is supplied via wireless portion 1 to antennas ANT1-ANT4, which send radio waves to an intended mobile terminal.

A structure of base station CS2 differs from that of base station CS1 in that the plurality of antennas (e.g., antennas ANT1-ANT4), wireless portion 1, receiving portion 2, demodulating portion 3, control portion 4, sending portion 5, modulating portion 6 and central control portion 7 in base station CS1 are replaced with a wireless portion 11, a receiving portion 12, a demodulating portion 13, a control portion 14, a sending portion 15, a modulating portion 16 and a central control portion 17, respectively. Operations of the respective portions in base station CS2 are the same as those of the corresponding portions in base station CS1, and therefore description thereof is not repeated.

Although the base stations are represented by functions blocks in FIG. 2, functions of these base stations are practically achieved by a Digital Signal Processor (DSP). The DSP is a kind of computer, which can achieve various functions by reading predetermined programs from a memory (not shown) and executing them. The program of the DSP can be downloaded from a control center (not shown) over the public network (not shown) to the base station, In the base station device, one of base stations CS1 and CS2 operates as a master base station, and the other operates as a slave base station. Signal line 20 is arranged between the master and slave base stations for transmitting the control signal.

In a standard operation state, the master base station uses one of four wireless channels as a control channel. The master base station uses the other three wireless channels as information channels, respectively. Thus, the master base station performs the operation of 1C3T.

Although not shown, a cable channel (I' channel) is connected to central control portions 7 and 17, and accommodates a required number of lines such as (4B+D) for each base station. The above "4B" represents four B-channels each capable of data transmission at 64 kbps, and "D" represents one D-channel utilized for control or packet communication.

In the standard operation state, the slave base station uses all the four wireless communication channels as the information channels, respectively. Thus, the slave base station performs the operation of 4T.

In the initial state, the base station is set to the master side or the slave side, and this selection or determination is performed, e.g., by externally sending data for instruction via a line or network, by arranging and operating a switch in each base station for setting to the master or slave, or by appropriately arranging pins of a connector connected to signal line 20.

First Embodiment

When traffic concentrates on the base station (master base station) sending-control channel CCH, it can be considered that the master base station could achieve the best conditions for allocating channels to the mobile terminals. In this case, more users can be accommodated by changing the base station sending control channel CCH.

Figure 3:
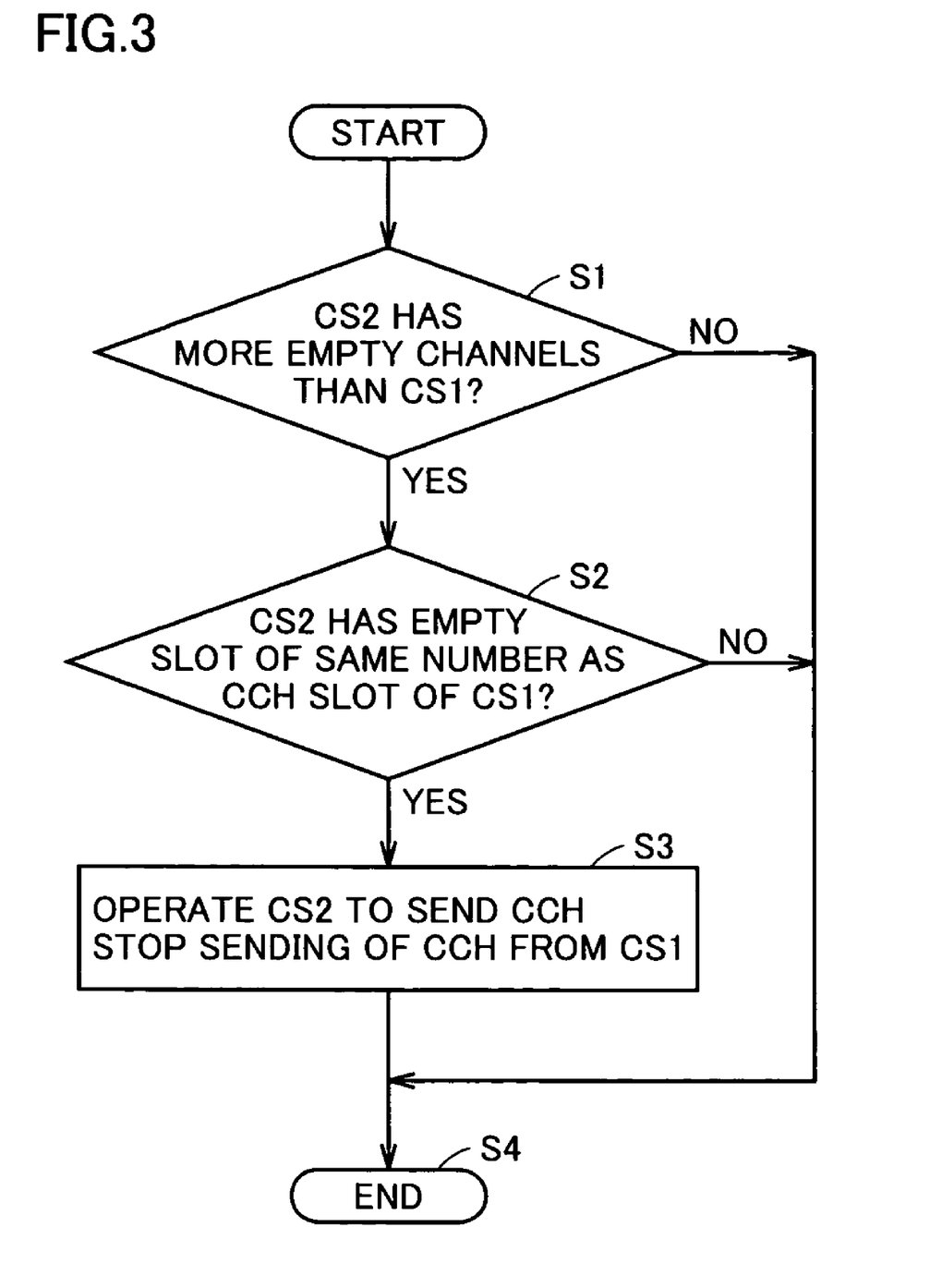
FIG. 3 is a flowchart illustrating an operation of switching a control channel in the case where a base station CS1 is on a master side according to a first embodiment.

FIG. 3 is a flowchart for illustrating an operation of switching the control channel in the case where base station CS1 is on the master side.

Referring to FIGS. 2 and 3, description will now be given on the operation in the case where base station CS1 is currently operating as the master base station. In this case, one of channels of four slots in base station CS1 is used as control channel CCH, and the other three slots can be used as information channels TCH. All channels of four slots of base station CS2 can be used as information channels TCH.

In base station CS1, central control portion 7 monitors the state of use of the information channels in base station CS2 via signal line 20. Central control portion 7 compares the state of use of the information channels in base station CS1 with that in base station CS2. This comparison may be performed when a call starts in response to an incoming calling by a mobile terminal, i.e., when the base station receives a request message for establishment of a link channel. Conversely, the comparison may be performed when the call to the mobile terminal ends, i.e., when the wireless channel is cut off. Further, the comparison may be performed at intervals of a constant time.

In step S1, central control portion 7 compares the empty information of information channels TCH of base station CS1 with that of base station CS2, and determines whether base station CS2 has more empty channels than base station CS1 or not.

If base station CS1 has the empty channels equal to or more than those of base station CS2, improvement in efficiency of traffic cannot be expected even if control channel CCH is changed to base station CS2 so that the operation moves to a step S4, and the state of sending control channel CCH from base station CS1 is maintained.

If base station CS2 has fewer empty channels than base station CS1, the operation moves to a step S2. In step S2, central control portion 7 determines whether the slot bearing the same number as the time slot, which is being used as control channel CCH by base station CS1, is empty in base station CS2 or not. Since control channel CCH must be synchronized with that in the other base station, the same slots must be used.

If base station CS2 is using the slot of the same number, it is impossible to change control channel CCH so that the operation moves to step S4, and the state of sending control channel CCH from base station CS1 is maintained.

If the slot of the same number as the time slot, which is being used as control channel CCH in base station CS1, is empty in base station CS2, the operation moves to a step S3.

In step S3, central control portion 7 sends an instruction via signal line 20 to base station CS2 to send control channel CCH from this time. At the same time, central control portion 7 stops the sending of control channel CCH from base station CS1. The control channel of the base station, which has been operating as the master base station, becomes available for use as the information channel.

As described above, control channel CCH on base station CS1 of larger traffic is changed to base station CS2 of smaller traffic so that more information channels are available in base station CS1. Large traffic means many users, and it can be considered that the base station CS1 can provide better communication conditions (e.g., less interference with neighboring radio waves) at that point in time. Base station CS1 of better communication conditions can perform the communication with mobile terminal to a larger extent, and the communication can be stable. Users can perform outgoing and incoming calls with respect to the base station more easily.

Figure 4:
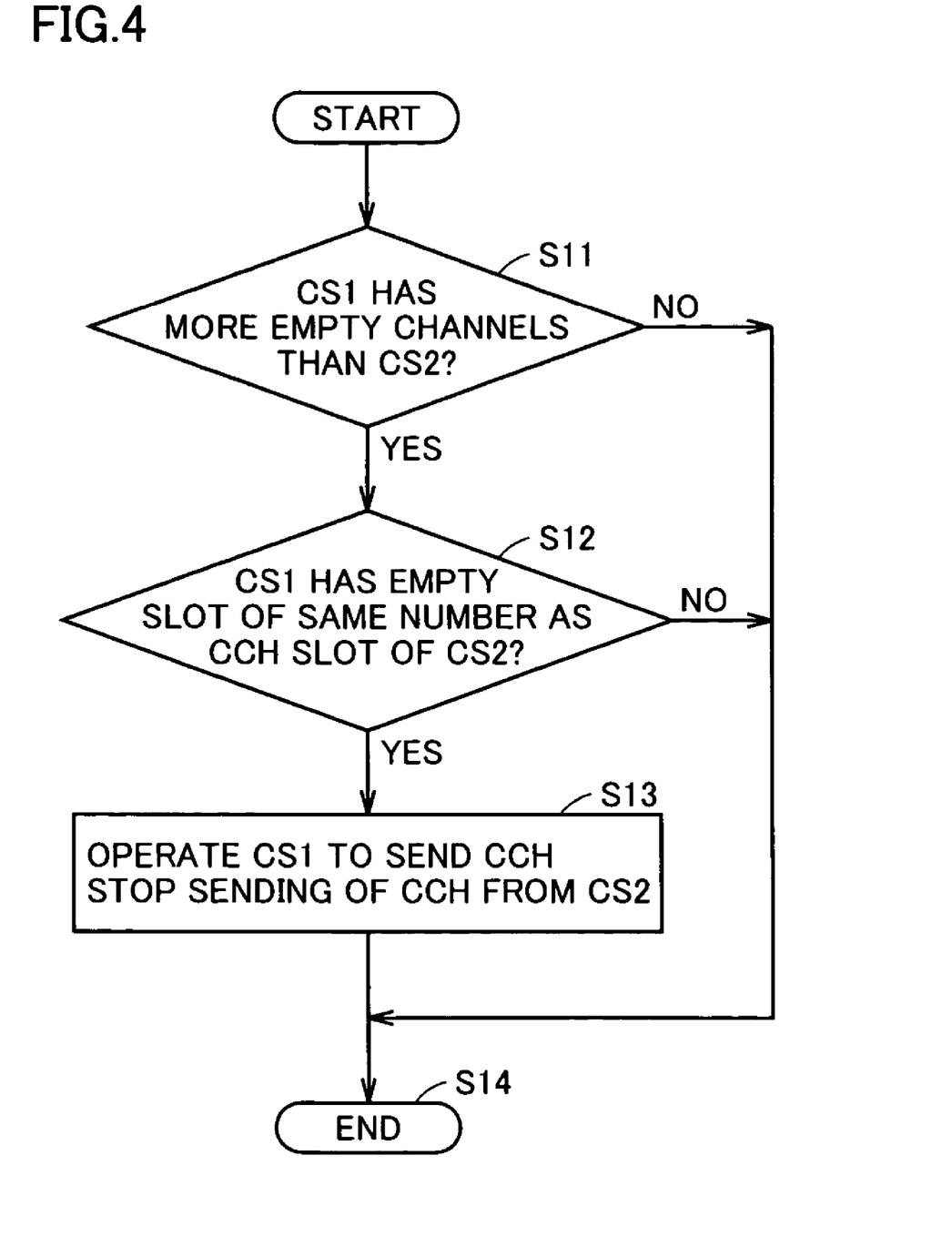
FIG. 4 is a flowchart illustrating an operation of switching a control channel in the case where a base station CS2 is on the master side according to a first embodiment.

FIG. 4 is a flowchart for illustrating an operation of switching the control channel in the case where base station CS2 is on the master side.

Referring to FIGS. 2 and 4, description will now be given on the operation in the case where base station CS2 is currently operating as the master base station. In this case, one of channels of four slots in base station CS2 is used as control channel CCH, and the other three slots can be used as information channels TCH. All channels of four slots of base station CS1 can be used as information channels TCH.

In base station CS2, central control portion 17 monitors the state of use of the information channels in base station CS1 via signal line 20. Central control portion 17 compares the state of use of the information channels in base station CS2 with that in base station CS1. This comparison may be performed when a call starts in response to an incoming calling by a mobile terminal, i.e., when the base station receives a request message for establishment of a link channel. Conversely, the comparison may be performed when the call to the mobile terminal ends, i.e., when the wireless channel is cut off. Further, the comparison may be performed at intervals of a constant time.

In step S11, central control portion 17 compares the empty information of information channels TCH of base station CS2 with that of base station CS1, and determines whether base station CS1 has more empty channels than base station CS2 or not.

If base station CS2 has the empty channels equal to or more than those of base station CS1, improvement in efficiency of traffic cannot be expected even if control channel CCH is changed to base station CS1 so that the operation moves to a step S14, and the state of sending control channel CCH from base station CS2 is maintained.

If base station CS1 has more empty channels than base station CS2, the operation moves to a step S12. In step S12, central control portion 17 determines whether the slot bearing the same number as the time slot, which is being used as control channel CCH by base station CS2, is empty in base station CS1 or not. Since control channel CCH must be synchronized with that in the other base station, the same slots must be used.

If base station CS1 is using the slot of the same number, it is impossible to change control channel CCH so that the operation moves to step S14, and the state of sending control channel CCH from base station CS2 is maintained.

If the slot of the same number as the time slot, which is being used as control channel CCH in base station CS2, is empty in base station CS1, the operation moves to a step S13. In step S13, central control portion 17 sends an instruction via signal line 20 to base station CS1 to send control channel CCH from this time. At the same time, central control portion 17 stops the sending of control channel CCH from base station CS2. The control channel of the base station, which has been operating as the master base station, becomes available for use as the information channel.

As described above, control channel CCH on base station CS2 of larger traffic is changed to base station CS1 of smaller traffic so that more information channels are available in base station CS2. Large traffic means many users, and it can be considered that the base station CS2 can provide better communication conditions (e.g., less interference with neighboring radio waves) at that point in time. Base station CS2 of better communication conditions can perform the communication with mobile terminal to a larger extent, and the communication can be stable. Users can perform outgoing and incoming calls with respect to the base station more easily.

Second Embodiment

In the base station (master base station) sending control channel CCH, only three channels are available for information channels TCH. If these three channels include only one empty channel, communication at 64 kbps cannot be performed when requested. In this case, the base station sending control channel CCH is changed so that the communication at 64 kbps can be offered.

Figure 5:
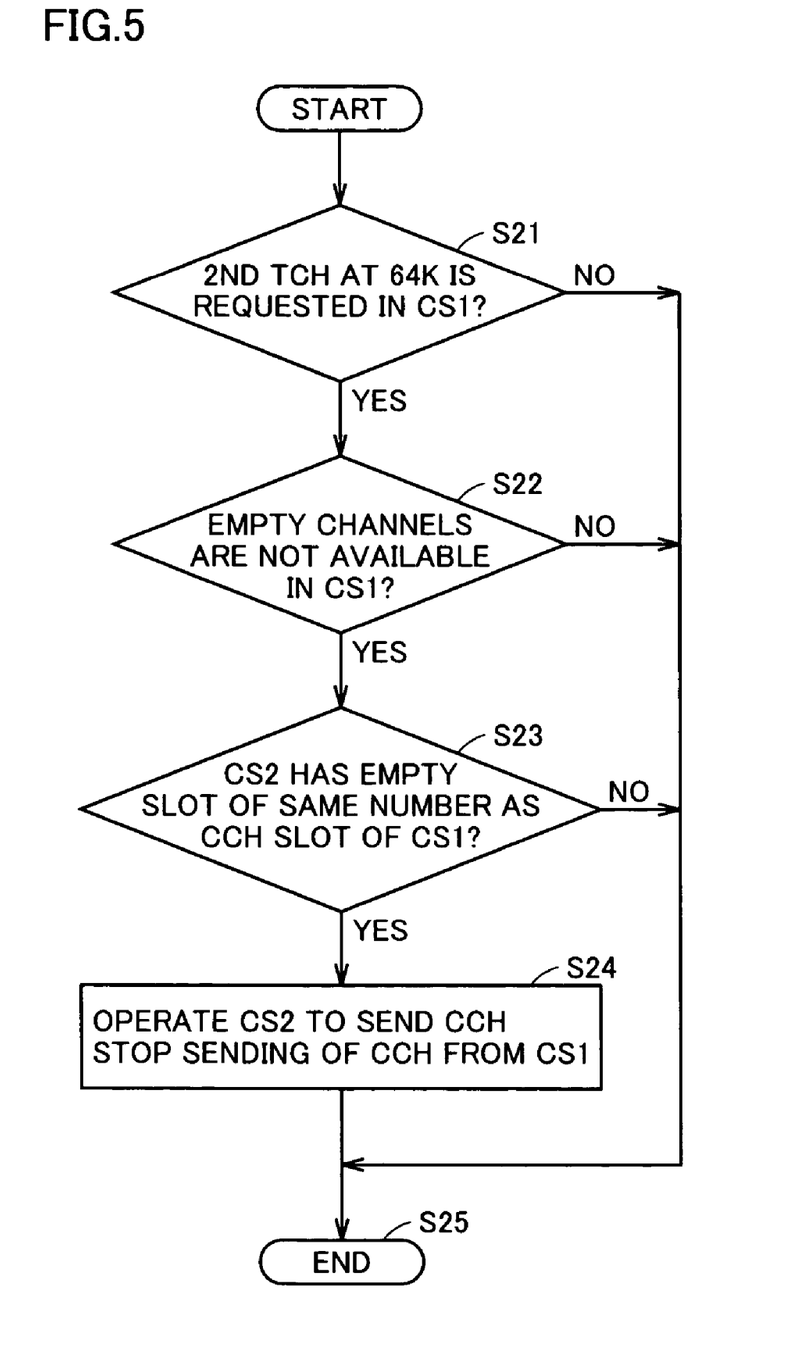
FIG. 5 is a flowchart illustrating an operation in the case where a base station CS1 is on the master side according to a second embodiment, and particularly an operation for switching a control channel of a base station when 64-kbps communication is requested.

FIG. 5 is a flowchart illustrating an operation in the case where base station CS1 is on the master side according to the second embodiment, and particularly an operation for switching the control channel of the base station when 64-kbps communication is requested.

Referring to FIGS. 2 and 5, description will now be given on the operation in the case where base station CS1 is currently operating as the master base station. In this case, one of channels of four slots in base station CS1 is used as control channel CCH, and the other three slots can be used as information channels TCH. All channels of four slots of base station CS2 can be used as information channels TCH.

In a step S21, central control portion 7 determines whether a call incoming from a mobile terminal in an area of base station CS1 is requesting communication at 64 kbps, which requires activation of a second information channel TCH in addition to first information channel TCH, or not. When the activation of second information channel TCH is not required, the operation moves to a step S25 to maintain a state of sending control channel CCH from base station CS1.

When activation of second information channel TCH is required, the operation moves to a step S22. Central control portion 7 checks the state of use of the channels in base station CS1, and determines whether two empty channels are available or not. If two channels are available for information channels TCH, the operation moves to a step S25, and the state of sending control channel CCH from base station CS1 is maintained because the communication service at 64 kbps can be offered in the current situation.

When two channels are not available for information channels TCH, and thus there is no empty channel in base station CS1, the operation moves to a step S23. In step S23, central control portion 7 determines whether the slot bearing the same number as the time slot, which is being used as control channel CCH in base station CS1, is empty in base station CS2 or not. Since control channel CCH must be synchronized with that in the other base station, the same slots must be used.

If base station CS2 is using the slot of the same number, it is impossible to change control channel CCH so that the operation moves to step S25, and the state of sending control channel CCH from base station CS1 is maintained.

If the slot of the same number as the time slot, which is being used as control channel CCH in base station CS1, is empty in base station CS2, the operation moves to a step S24. In step S24, central control portion 7 sends an instruction via signal line 20 to base station CS2 to send control channel CCH from this time. At the same time, central control portion 7 stops the sending of control channel CCH from base station CS1. When the processing in step S24 ends, the operation moves to step S25, and the change of control channel CCH is completed.

Figure 6:
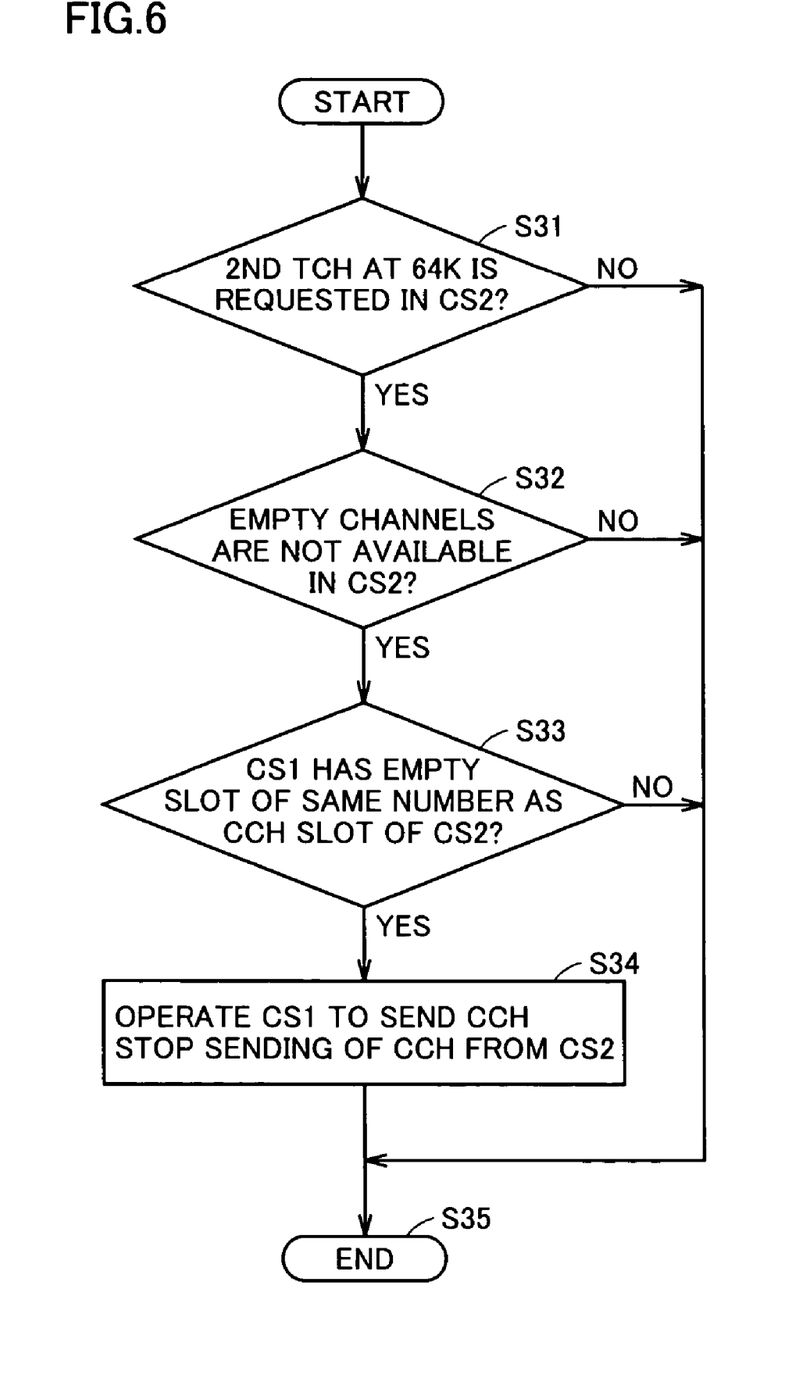
FIG. 6 is a flowchart illustrating an operation in the case where a base station CS2 is on the master side according to a second embodiment, and particularly an operation for switching a control channel of a base station when 64-kbps communication is requested.

FIG. 6 is a flowchart illustrating an operation in the case where base station CS2 is on the master side according to the second embodiment, and particularly an operation for switching the control channel of the base station when 64-kbps communication is requested.

Referring to FIGS. 2 and 6, description will now be given on the operation in the case where base station CS2 is currently operating as the master base station. In this case, one of channels of four slots in base station CS2 is used as control channel CCH, and the other three slots can be used as information channels TCH. All channels of four slots of base station CS1 can be used as information channels TCH.

In a step S31, central control portion 17 determines whether a call incoming from a mobile terminal in an area of base station CS2 is requesting communication at 64 kbps, which requires activation of the second information channel TCH in addition to first information channel TCH, or not. When the activation of second information channel TCH is not required, the operation moves to a step S35 to maintain a state of sending control channel CCH from base station CS2.

When activation of second information channel TCH is required, the operation moves to a step S32. Central control portion 17 checks the state of use of the channels in base station CS2, and determines whether two empty channels are available or not. If two channels are available for information channels TCH, the operation moves to a step S35, and the state of sending control channel CCH from base station CS2 is maintained because the communication service at 64 kbps can be offered in the current situation.

When two channels are not available for information channels TCH, and thus there is no empty channel in base station CS2, the operation moves to a step S33. In step S33, central control portion 17 determines whether the slot bearing the same number as the time slot, which is being used as control channel CCH in base station CS2, is empty in base station CS1 or not. Since control channel CCH must be synchronized with that in the other base station, the same slots must be used.

If base station CS1 is using the slot of the same number, it is impossible to change control channel CCH so that the operation moves to step S35, and the state of sending control channel CCH from base station CS2 is maintained.

If the slot of the same number as the time slot, which is being used as control channel CCH in base station CS2, is empty in base station CS1, the operation moves to a step S34. In step S34, central control portion 17 sends an instruction via signal line 20 to base station CS1 to send control channel CCH from this time. At the same time, central control portion 17 stops the sending of control channel CCH from base station CS2. When the processing in step S34 ends, the operation moves to step S35, and the change of control channel CCH is completed.

As described above, when communication at 64 kbps is requested in the base station on the master side, control channel CCH is transferred to the base station on the slave side if the second channel required for the 64-kbps communication cannot be ensured in the base station on the master side. Thereby, the base station on the master side can offer the communication service at 64 kbps using the two wireless channels to the user so that the communication service at 64 kbps can be offered to up to two users.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A base station device for performing wireless communication with a mobile terminal device, comprising:
    first and second base stations, one of said first and second base stations operating as a master base station using one of a plurality of wireless channels as a control channel and using the other wireless channel(s) as an information channel(s), and the other of said first and second base stations operating as a slave base station receiving a control signal from said master base station for operation; and
    a signal line connecting said first and second base stations together for sending said control signal from said master base station to said slave base station, wherein each of said first and second base stations includes:
        a central control portion operating, when the corresponding first or second base station is operating as said master base station, to observe a state of an empty channel of said slave base station, use as said control channel the empty channel of the base station currently operating as said slave base station depending on the state of the empty channel of said slave base station, and make said control channel of the base station currently operating as the master base station available for use as the information channel.

2. The base station device according to claim 1, wherein said central control portion compares the number of empty channels of said master base station with the number of the empty channels of said slave base station, and operates, when said slave base station has more empty channels than said master base station, to use as said control channel the empty channel of the base station currently operating as said slave base station, and makes said control channel of the base station currently operating as the master base station available for use as said information channel.

3. The base station device according to claim 1, wherein when said master base station is requested to perform communication using the two information channels, but cannot ensure said two information channels, and said slave base station has an empty channel, said central control portion uses as said control channel the empty channel of the base station currently operating as said slave base station, and makes said control channel of the base station currently operating as the master base station available for use as said information channel.

4. A control method of a base station device performing wireless communication with a mobile terminal device, said base station including first and second base stations and a signal line, one of said first and second base stations operating as a master base station using one of wireless channels as a control channel and using the other wireless channel(s) as an information channel(s), the other of said first and second base stations operating as a slave base station receiving a control signal from said master base station for operation, said signal line connecting said first and second base stations together for sending said control signal from said master base station to said slave base station, and said method comprising the steps of:
    operating the base station operating as said master base station to observe via said signal line a state of an empty channel of said slave base station, and determine, depending on the state of the empty channel of said slave base station, whether switching is to be performed to use as said control channel the empty channel of said slave base station; and
    operating the base station operating as said master base station to use as said control channel the empty channel of the base station currently operating as the slave base station, make said control channel of the base station currently operating as the master base station available for use as said information channel, and perform switching between said master base station and said slave base station.

5. The control method of the base station device according to claim 4, further comprising the step of:
    comparing the number of empty channels of said master base station with the number of the empty channels of said slave base station, and determining whether said slave base station has more empty channels than said master base station or not.

6. The control method of the base station device according to claim 4, further comprising the steps of:
    determining whether said master base station is requested to perform communication using the two information channels or not;
    determining that said master base station cannot ensure said two information channels, wherein
    said step of operating the base station to observe and determine decides the switching when said slave base station has the empty channel.

7. A computer readable medium containing program code, which, when executed, causes a computer to execute a control method of a base station device performing wireless communication with a mobile terminal device, wherein
    said base station includes first and second base stations and a signal line, one of said first and second base stations operates as a master base station using one of wireless channels as a control channel and using the other wireless channel(s) as an information channel(s), the other of said first and second base stations operates as a slave base station receiving a control signal from said master base station for operation, said signal line connects said first and second base stations together for sending said control signal from said master base station to said slave base station;
    said method comprising the steps of:
    operating the base station operating as said master base station to observe via said signal line a state of an empty channel of said slave base station, and determine, depending on the state of the empty channel of said slave base station, whether switching is to be performed to use as said control channel the empty channel of said slave base station; and operating the base station operating as said master base station to use as said control channel the empty channel of the base station currently operating as the slave base station, make said control channel of the base station currently operating as the master base station available for use as said information channel, and perform switching between said master base station and said slave base station.

8. The computer readable medium according to claim 7, wherein said control method further includes the step of:

comparing the number of empty channels of said master base station with the number of the empty channels of said slave base station, and determining whether said slave base station has more empty channels than said master base station or not.

9. The computer readable medium according to claim 7, wherein said control method further includes the step of:

determining whether said master base station is requested to perform communication using the two information channels or not;

determining that said master base station cannot ensure said two information channels, wherein said step of operating the base station to observe and determine decides the switching when said slave base station has the empty channel.

* * * * *